United States Patent
Schröder

(10) Patent No.: US 7,905,420 B2
(45) Date of Patent: Mar. 15, 2011

(54) PORTABLE DATA CARRIER AND METHOD FOR THE OPERATION OF A PORTABLE DATA CARRIER

(75) Inventor: Sönke Schröder, München (DE)

(73) Assignee: Giesecke & Devrient GmbH, Munich (DE)

( * ) Notice: Subject to any disclaimer, the term of this patent is extended or adjusted under 35 U.S.C. 154(b) by 350 days.

(21) Appl. No.: 11/919,234

(22) PCT Filed: Apr. 28, 2006

(86) PCT No.: PCT/EP2006/003989
§ 371 (c)(1),
(2), (4) Date: Apr. 30, 2008

(87) PCT Pub. No.: WO2006/117151
PCT Pub. Date: Nov. 9, 2006

(65) Prior Publication Data
US 2009/0277964 A1  Nov. 12, 2009

(30) Foreign Application Priority Data
Apr. 29, 2005  (DE) .......................... 10 2005 020 101

(51) Int. Cl.
*G06K 19/06* (2006.01)
*G06K 19/00* (2006.01)
(52) U.S. Cl. ....................................... 235/492; 235/487
(58) Field of Classification Search .................. 235/487, 235/492; 340/10, 572
See application file for complete search history.

(56) References Cited

U.S. PATENT DOCUMENTS

| 5,376,778 | A | 12/1994 | Kreft |
| 6,693,541 | B2 * | 2/2004 | Egbert ......................... 340/572.7 |
| 6,840,440 | B2 * | 1/2005 | Uozumi et al. ................ 235/375 |
| 7,132,944 | B1 * | 11/2006 | Kron et al. ................... 340/572.1 |
| 7,132,946 | B2 * | 11/2006 | Waldner et al. ............. 340/572.1 |
| 2001/0043141 | A1 | 11/2001 | Tuttle |
| 2003/0132301 | A1 | 7/2003 | Selker |
| 2005/0001723 | A1 * | 1/2005 | Takei .......................... 340/572.3 |

FOREIGN PATENT DOCUMENTS

| DE | 42 05 556 A1 | 8/1993 |
| DE | 44 38 286 C1 | 5/1996 |
| DE | 196 14 455 A1 | 10/1997 |
| DE | 198 17 566 A1 | 10/1999 |

(Continued)

OTHER PUBLICATIONS

Search Report of German Patent and Trademark Office relating to German Patent Application No. 10 2005 020 101.6, Oct. 27, 2006.

*Primary Examiner* — Daniel A Hess
*Assistant Examiner* — Matthew Mikels
(74) *Attorney, Agent, or Firm* — Bacon & Thomas, PLLC

(57) ABSTRACT

The invention relates to a portable data carrier (1) with an electronic circuit (13) for storing and/or processing data, and an oscillating circuit (29, 30, 31) for contactless communication and/or energy transmission. The inventive portable data carrier (1) is characterized in that a control device (30, 31), which is influenceable from the outside, is provided to change the resonant frequency ($f_{res}$) of the oscillating circuit (29, 30, 31) between a first frequency range and a second frequency range.

17 Claims, 1 Drawing Sheet

FOREIGN PATENT DOCUMENTS

| | | |
|---|---|---|
| DE | 199 50 524 A1 | 4/2001 |
| DE | 196 21 076 C2 | 6/2001 |
| DE | 698 01 926 T2 | 6/2002 |
| DE | 695 32 399 T2 | 10/2004 |
| EP | 1 056 040 A1 | 11/2000 |
| EP | 1 387 313 A2 | 2/2004 |
| WO | WO 02/27650 A1 | 4/2002 |

* cited by examiner

PORTABLE DATA CARRIER AND METHOD FOR THE OPERATION OF A PORTABLE DATA CARRIER

FIELD OF THE INVENTION

The invention relates to a portable data carrier and a method for operating a portable data carrier.

BACKGROUND OF THE INVENTION

It is known in a portable data carrier, for example in a chip card, to either deny or to permit, in dependence on the state of a mechanical switch, a contactless communication between the portable data carrier and for example a corresponding reading device. For this purpose, the mechanical switch interrupts a galvanic connection or establishes such a connection. However, such mechanical switches are comparatively difficult to produce and are furthermore subject to wear.

As an alternative approach it is known to select an operation mode of a chip card in dependence on a detected state. Thus for example a contactless communication is denied by an internal control mechanism, if the chip card is supplied with an external voltage via the contact surfaces of the chip module.

SUMMARY OF THE INVENTION

It is the problem of the invention to provide a portable data carrier and a method for operating a portable data carrier with a simple, but reliable mechanism for enabling a contactless communication and/or transmission of energy.

The inventive portable data carrier has an electronic circuit for storing and/or processing data and an oscillating circuit for contactless communication and/or transmission of energy. The special feature of the inventive data carrier is that a control device is provided, which is influenceable from the outside and which serves to change the resonant frequency of the oscillating circuit between a first frequency range and a second frequency range.

If a strictly predetermined frequency is provided for the contactless communication with the portable data carrier and for the contactless transmission of energy to the portable data carrier, the inventive embodiment of the portable data carrier enables the user to control the contactless communication and energy transmission, since a contactless communication and energy transmission with an appreciable reach only takes place near the resonant frequency of the oscillating circuit. The user can decide when to permit a contactless communication or energy transmission and when not to permit it. This has the advantage of an increase of security for the user of the portable data carrier, since he can prevent an undesired external influence on the portable data carrier, and can decide who can transmit which data to the portable data carrier, or receive data from the portable data carrier.

The inventive portable data carrier is preferably designed in such a way that the capacitance of the oscillating circuit can be changed by means of the control device. Such a control device can be implemented easily and does not require any movable components. The design is particularly compact if the control device is designed in such a way that it forms part of the oscillating circuit at least temporarily. In this case the change of the resonant frequency is effected by alternatively integrating the control device in the oscillating circuit or separating it therefrom.

In a preferred embodiment the control device has an operation element, which upon touching changes the resonant frequency of the oscillating circuit. It can for example be provided therein that the contactless communication and/or energy transmission is only possible at the changed resonant frequency, since this frequency is near the transmission frequency of the communication partner. In this case the user can permit a contactless communication or energy transmission by touching the operation element. Without such a touch the portable data carrier is locked, since the resonant frequency given in this case is too far away from the transmission frequency of the communication partner. I. e. the portable data carrier is designed in such a way that, as long as the operation element is not touched by the user, the oscillating circuit is strongly detuned in relation to the predetermined transmission frequency.

In order to provide for a good accessibility, the operation element is preferably arranged in the surface of the portable data carrier. In particular, the operation element forms part of at least one capacitor or is connected in an electrically conductive way to at least one capacitor. Therein the operation element is for example designed in such a way that it has two electrically conductive surfaces. The two electrically conductive surfaces can be arranged side by side on the same side of the portable data carrier and can be connected to each other comfortably by means of one finger. Likewise it is also possible to arrange the two electrically conductive surfaces on opposing sides of the portable data carrier. In this case the electrically conductive surfaces can for example be connected with each other in that the portable data carrier is held between thumb and index finger. On the surface of the card these surfaces can also be implemented e. g. in the form of holograms.

The inventive portable data carrier is preferably designed as a chip card.

The invention furthermore relates to a method for operating a portable data carrier with an oscillating circuit for contactless communication and/or energy transmission. The inventive method is characterized in that the oscillating circuit is influenced from the outside in such a way that it has a resonant frequency within a first frequency range when the contactless communication and/or energy transmission is to be permitted, and has a resonant frequency within a second frequency range when the contactless communication and/or energy transmission is to be denied.

In a variant of the inventive method a change of the resonant frequency caused by influencing the oscillating circuit from the outside is sustained for such a time as the influence on the oscillating circuit persists. In this variant the behavior of the portable data carrier is very transparent for the user, so that there is hardly any danger of an operation error. When uninfluenced from the outside, the oscillating circuit preferably has a resonant frequency within the second frequency range, and is consequently blocked for any contactless communication and/or energy transmission. In order to permit the contactless communication and/or energy transmission, an active operation by the user is required.

In a further variant of the inventive method a change caused by influencing the oscillating circuit from the outside is sustained until a further influence from the outside is exerted on the oscillating circuit. This has the advantage that the influence does not have to be maintained throughout the period of contactless communication and/or energy transmission.

Through the influence from the outside preferably the capacitance of the oscillating circuit is changed. Therein the influence from the outside is in particular exerted in the form of a skin contact by a user. Thereby a simple handling is guaranteed. The contactless communication and/or energy transmission can be carried out at a frequency within the first frequency range. In a further development of the inventive method, at a frequency within the second frequency range, no contactless communication, but a contactless energy transmission is carried out, which is sufficient for an operation of the portable data carrier. Thereby the operation of the portable data carrier is ensured also in the second frequency range and any undesired communication with the portable data carrier is denied nonetheless.

The influence exerted on the oscillating circuit from the outside not only can serve to change the resonant frequency, but it can also trigger the transition of an electronic circuit of the portable data carrier to a defined state.

The invention will hereinafter be explained with reference to the embodiments shown in the drawing, in which the portable data carrier is respectively designed as a chip card. However, the invention is not limited to chip cards, but relates equally also to other portable data carriers. Therein a portable data carrier in the sense of the invention is a computer system in which the resources, i. e. memory resources and/or computing power (computing performance) are limited, e. g. a chip card (Smart Card, microprocessor chip card) or a token or a chip module for integration into a chip card or into a token. The portable data carrier has a body, in which a CPU (a microprocessor) is arranged, and which can have any desired standardized or non-standardized shape, for example the shape of a flat chip card without standard or according to a standard, such as e. g. ISO 7810 (e. g. ID-1, ID-00, ID-000), or that of a voluminous token. Furthermore, the portable data carrier can have one or several interfaces of any type for contactless and/or contact communication with a reading device or data processing system (e. g. personal computer, workstation, server).

DETAILED DESCRIPTION OF VARIOUS EMBODIMENTS

Figure 1:
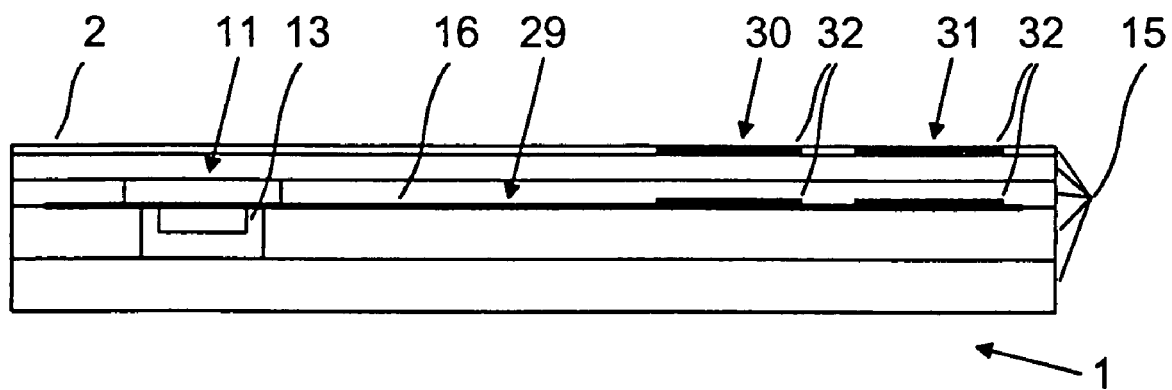
FIG. 1 a schematic cross section of an embodiment of an inventively designed chip card and FIG. 2 a schematic top view of the chip card shown in FIG. 1.
Figure 2:
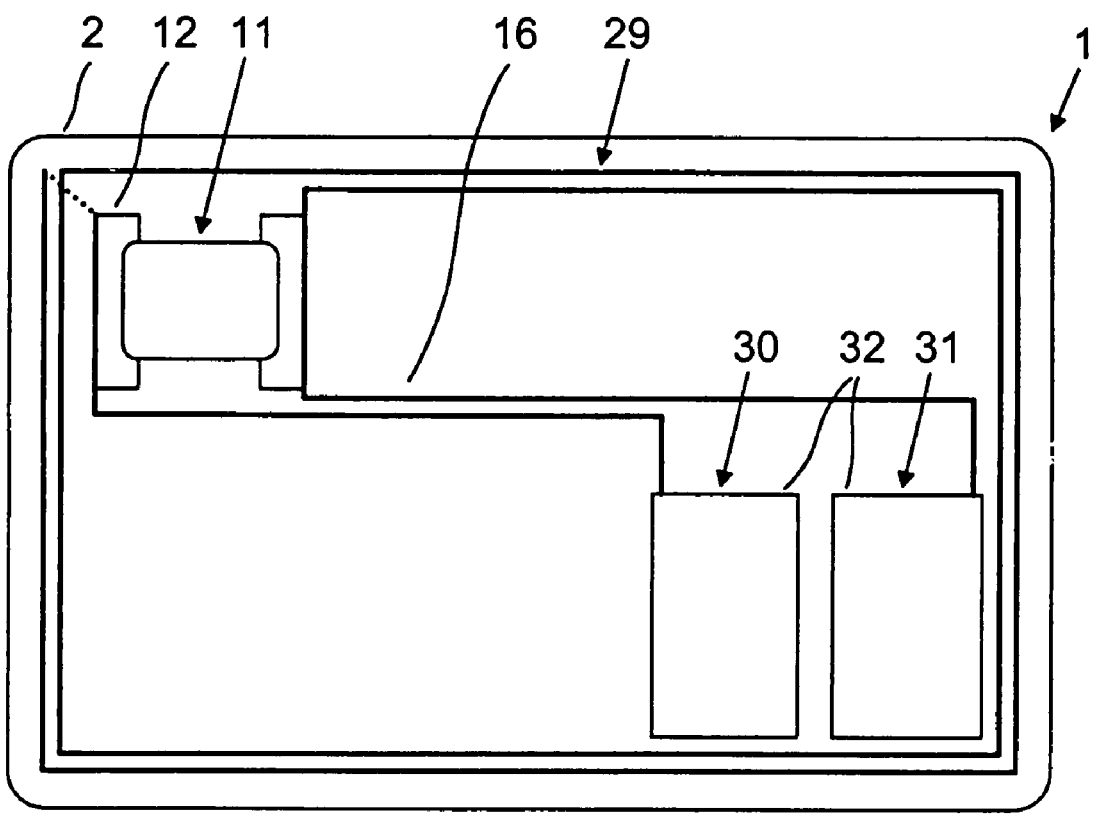

FIG. 1 shows a schematic cross section of an embodiment of an inventively designed chip card 1. The representation is not strictly limited to one section plane, but also shows components of the chip card 1 which are arranged offset from each other. Therefore, no hatchings were used. For reasons of clarity the representation is drawn greatly not to scale. A pertinent top view of the chip card 1, in which also components arranged on the inside of the chip card 1 are shown, is represented in FIG. 2.

The chip card 1 has a card body 2, in which a chip module 11 is embedded and connected in an electrically conductive manner with electrical connection elements 12. The chip module 11 contains a microcontroller 13, in which for example an application software of the chip card 1 is implemented. The card body 2 is preferably implemented in accordance with the standard ISO/IEC 7810 in regard of its dimensions, and is made of five plastic foils 15 in the shown embodiment. A suitable material for the plastic foils 15 is for example PVC. For the production of the chip card 1 the plastic foils 15 are stacked on top of each other in sheet format and are connected to each other preferably by heat lamination. Likewise, also other methods can be used for producing the card body 2. Beforehand, the electrical connection elements 12 and conductive paths 16 connected thereto are applied on at least one of the plastic foils, for example by printing with silver conductive paste. During the heat lamination the plastic foils 15 soften and are fused to each other. Optionally, a laminating glue can be used therein, which glue connects the plastic foils 15 to each other. The laminating glue can for example be used in the form of thin foils, which are arranged respectively between adjacent plastic foils 15. Likewise, it is possible to coat the plastic foils 15 with the laminating glue, or to use co-extruded plastic foils 15. After the heat lamination the chip cards 1 are singled by punching out.

By the conductive paths 16 an antenna coil 29 is formed, which is connected to the chip module 11, and consequently also the microcontroller 13, via the electrical connection elements 12. Furthermore, a first capacitor 30 and a second capacitor 31 are provided. The capacitors 30 and 31 are formed respectively by two capacitive surfaces 32 arranged parallel at a distance from each other. In both capacitors 30 and 31 one capacitive surface 32 each is arranged flush with the surface of the card body 2 and is therefore accessible from the outside. The respectively other capacitive surface 32 is arranged on the inside of the card body 2 and is connected to one of the electrical connection elements 12 via a conductive path 16.

When the two outer capacitive surfaces 32 are connected to each other in an electrically conductive manner, a serial connection of the two capacitors 30 and 31 is established, which is connected in parallel to the antenna coil 29. The serial connection has a total capacitance $C_g$, which has the following relationship to the capacitances $C_1$ of the first capacitor 30 and $C_2$ of the second capacitor 31:

$$1/C_g = 1/C_1 + 1/C_2.$$

The total capacitance $C_g$ influences the resonant frequency $f_{res}$ of the oscillating circuit formed together with the antenna coil 29 and the capacitance of the chip module 11. The following is applicable for the resonant frequency $f_{res}$:

$$f_{res} = 1/2\pi\sqrt{LC}.$$

Therein L is the inductance and C is the capacitance of the oscillating circuit. The serial connection of the two capacitors 30 and 31 established by connecting the outer capacitive surfaces 32 increases the capacitance C of the oscillating circuit and consequently reduces the resonant frequency $f_{res}$. This effect can for example be used in that the oscillating circuit without the two capacitors 30 and 31 is detuned in relation to the transmitting frequency of a reading device. For example the transmitting frequency of the reading device is 13.56 MHz and the resonant frequency $f_{res}$ of the oscillating circuit is more than 40 MHz. Under these circumstances a transmission of energy and data between the reading device and the chip card 1 is hardly possible. By connecting the two outer capacitive surfaces 32 the resonant frequency $f_{res}$ of the oscillating circuit is reduced and thereby approached to the transmitting frequency of the reading device, so that a data transmission is possible. In this manner it is possible to switch between a state in which a transmission of energy and data is possible and a state in which both is impossible. The owner of the chip card 1 consequently has the possibility to decide whether he permits a transmission of energy and data or not. Thereby, any undesired access to the chip card 1 can be denied, since a communication with the chip card 1 is only possible provided that the owner of the chip card 1 establishes a connection between the outer capacitive surfaces 32. In a variant it is provided to transmit a sufficient amount of energy in order to enable the operation of the microcontroller 13, even if a data transmission is impossible.

In order to permit the omission of auxiliary means for connecting the outer capacitive surfaces 32, it is provided in a further development to establish this connection by touching with a finger. However, in this case no direct galvanic contact is established, but the human body is integrated into the serial connection of the capacitors 30 and 31 as a further capacitance. Consequently, the following applies for the total capacitance $C_g$:

$$1/C_g = 1/C_1 + 1/C_2 + 1/C_h.$$

Therein $C_h$ represents the capacitance to be considered in the case of a skin contact. Typically $C_h$ amounts to approximately 5 nF and is considerably greater than the capacitances $C_1$ and $C_2$ of the two capacitors 30 and 31, since these are formed by the relatively small capacitive surfaces 32. In view of the serial connection this has the result that the total capacitance $C_g$ only depends on the capacitance $C_h$ of the skin to a very small degree. Nevertheless, the serial connection is only established through the capacitance of the skin $C_h$. This means that by touching the outer capacitive surfaces 32 for example with a finger, an approximately constant total capacitance $C_g$ can be connected in parallel to the antenna coil 29 or separated therefrom respectively.

The outer capacitive surfaces 32 can also be arranged on the front surface and the back surface of the card body 2. In this variant a connection between the outer capacitive surfaces 32 can for example be established by gripping the chip card 1 with the thumb and the index finger. Likewise, it is possible to arrange all capacitive surfaces 32 on the inside of the card body 2. In this variant other metallic areas on the surface of the card body 2 are provided for the skin contact, for example holograms which are present anyway, or prints with conductive ink, which are connected to some of the capacitive surfaces 32. The capacitive surfaces 32 can also be omitted completely, and the capacitors 30 and 31 can be implemented using conventional components, for example in SMD technology, instead.

In a variant the capacitors 30 and 31 are omitted completely and, by touching surfaces provided for this purpose for example with one finger, the skin capacitance $C_h$ is connected in parallel to the antenna coil 29.

However, therein any fluctuations of the value of the skin capacitance $C_h$ have a direct impact on the resonant frequency $f_{res}$.

The change of the resonant frequency $f_{res}$ effected by the change of capacitance is respectively sustained for such a time as the changed capacitance is present. This means that the chip card 1 has a changed resonant frequency $f_{res}$ for the duration of the contact with the surfaces provided for this purpose, and returns to its original resonant frequency $f_{res}$ as soon as the contact is disengaged. Alternatively, it is also possible to further process the change in capacitance for example by means of suitable electronics in such a way that it represents a triggering event for the switching process and the resulting switching state is maintained for such a time until the triggering event takes place a second time.

With all described variants the resonant frequency $f_{res}$ of the oscillating circuit can be influenced from the outside and it can thereby be determined whether a contactless communication with the chip card 1 is possible and whether the chip card 1 can be supplied with energy in a contactless manner. However, the change in capacitance brought about in each case can also be evaluated in a different way than via the resonant frequency $f_{res}$ of the oscillating circuit and/or be used for other purposes than controlling the transmission of data and/or energy. The already broached integration of electronics in particular opens up a multitude of possibilities.

Therein the microcontroller 13 is preferably used, which can provide the required electronics functions. Another purpose of use can for example consist in that the change in capacitance triggers a reset of the microcontroller 13 to a defined state. Such a measure is necessary if the microcontroller 13 was brought into an undefined state for example by electrostatic charging effects. This can happen during the production of the chip card 1 in particular. In the case that it really comes to an undefined state of the first microcontroller 13, the chip card 1 can only be used properly on the condition that is achieved to reset the first microcontroller 13 to a defined state. For this purpose it is only necessary to touch the provided surfaces of the chip card 1.

The chip card 1 is thus equipped with a capacitive sensor which reacts to touch and which does not have any movable components. With this capacitive sensor a direct and immediate influence on the oscillating circuit is rendered possible, which can in particular result in a change of the resonant frequency $f_{res}$. Likewise, the capacitive sensor can also trigger other switching operations.

The invention claimed is:

1. Portable data carrier having an electronic circuit for storing and processing data, and an oscillating circuit for contactless communication and energy transmission, comprising:
    a control device influenceable from outside the data carrier, and arranged to enable changing the resonant frequency of the oscillating circuit between a first frequency range and a second frequency range;
    the control device having an operation element, which upon skin contact by a user changes the resonant frequency of the oscillating circuit; and
    the oscillating circuit comprising an antenna coil and a capacitor and the operation element arranged on the surface of the portable data carrier to be directly touchable by the user forms part of the capacitor of the oscillating circuit.

2. Portable data carrier according to claim 1, wherein the oscillating circuit includes a capacitance that can be changed by means of the control device.

3. Portable data carrier according to claim 1, wherein the control device comprises part of the oscillating circuit at least temporarily.

4. Portable data carrier according to claim 1, wherein the operation element includes two electrically conductive surfaces.

5. Portable data carrier according to claim 4, wherein the two electrically conductive surfaces are arranged side by side on the same side of the portable data carrier.

6. Portable data carrier according to claim 4, wherein the two electrically conductive surfaces are arranged on opposite sides of the data carrier.

7. Portable data carrier according to claim 1, wherein the data carrier comprises a chip card.

8. Method for operating a portable data carrier having an oscillating circuit for contactless communication and energy transmission, comprising the steps of:
    influencing the oscillating circuit from outside the carrier in such a manner that the data carrier has a resonant frequency within a first frequency range when the contactless communication and energy transmission are enabled, and has a resonant frequency within a second frequency range when the contactless communication and energy transmission are disabled;

a control device having an operation element, which upon skin contact by a user changes the resonant frequency of the oscillating circuit by changing the capacitance of the oscillating circuit; and the oscillating circuit comprising an antenna coil and a capacitor, and the operation element arranged on the surface of the portable data carrier to be directly touchable by the user forms part of the capacitor of the oscillating circuit.

9. Method according to claim 8, wherein a change of the resonant frequency triggered by influencing the oscillating circuit from the outside is sustained for so long as the influence on the oscillating circuit persists.

10. Method according to claim 8, wherein, when uninfluenced from the outside, the oscillating circuit has a resonant frequency within the second frequency range.

11. Method according to claim 8, wherein a change of the resonant frequency triggered by influencing the oscillating circuit from the outside is sustained until a further influence is exerted on the oscillating circuit from the outside.

12. Method according to claim 8, further comprising the step of: changing the capacitance of the oscillating circuit by influence from the outside.

13. Method according to claim 8, further comprising the step of: carrying out one or both of the contactless communication and energy transmission at a frequency within the first frequency range.

14. Method according to claim 8, wherein at a frequency within the second frequency range no contactless communication, but a contactless energy transmission is carried out, which energy transmission is sufficient for operating the portable data carrier.

15. Method according to claim 8, wherein by influencing the oscillating circuit from the outside, a transition of an electronic circuit of the portable data carrier into a defined state is triggered.

16. Portable data carrier having an electronic circuit for storing and processing data, and an oscillating circuit for contactless communication and energy transmission, comprising:

a control device influenceable from outside the data carrier, and arranged to enable changing the resonant frequency of the oscillating circuit between a first frequency range and second frequency range, the control device having an operation element, which upon skin contact by a user changes the resonant frequency of the oscillating circuit, wherein the oscillating circuit comprises an antenna coil and a capacitor, and the operation element arranged on the surface of the portable data carrier to be directly touchable by the user forms part of the capacitor of the oscillating circuit, wherein within the first frequency range the contactless communication and energy transmission are enabled; and wherein at a frequency within the second frequency range no contactless communication, but a contactless energy transmission is carried out, which energy transmission is sufficient for operating the portable data carrier.

17. Method for operating a portable data carrier having an oscillating circuit for contactless communication and energy transmission, comprising the steps of:

influencing the oscillating circuit from outside the carrier in such as manner that the data carrier has a resonant frequency within a first frequency range when the contactless communication and energy transmission are enabled;

a control device having an operation element, which upon skin contact by a user changes the resonant frequency of the oscillating circuit by changing a capacitance of the oscillating circuit;

the oscillating circuit comprising an antenna coil and a capacitor, and the operation element arranged on the surface of the portable data carrier to be directly touchable by the user forms part of the capacitor of the oscillating circuit; and wherein at a frequency within the second frequency range no contactless communication, but a contactless energy transmission is carried out, which energy transmission is sufficient for operating the portable data carrier.

* * * * *